INVENTORS.
CLARK T. MORSE
EDWARD L. HOGAN
BY Toulmin + Toulmin
ATTORNEYS.

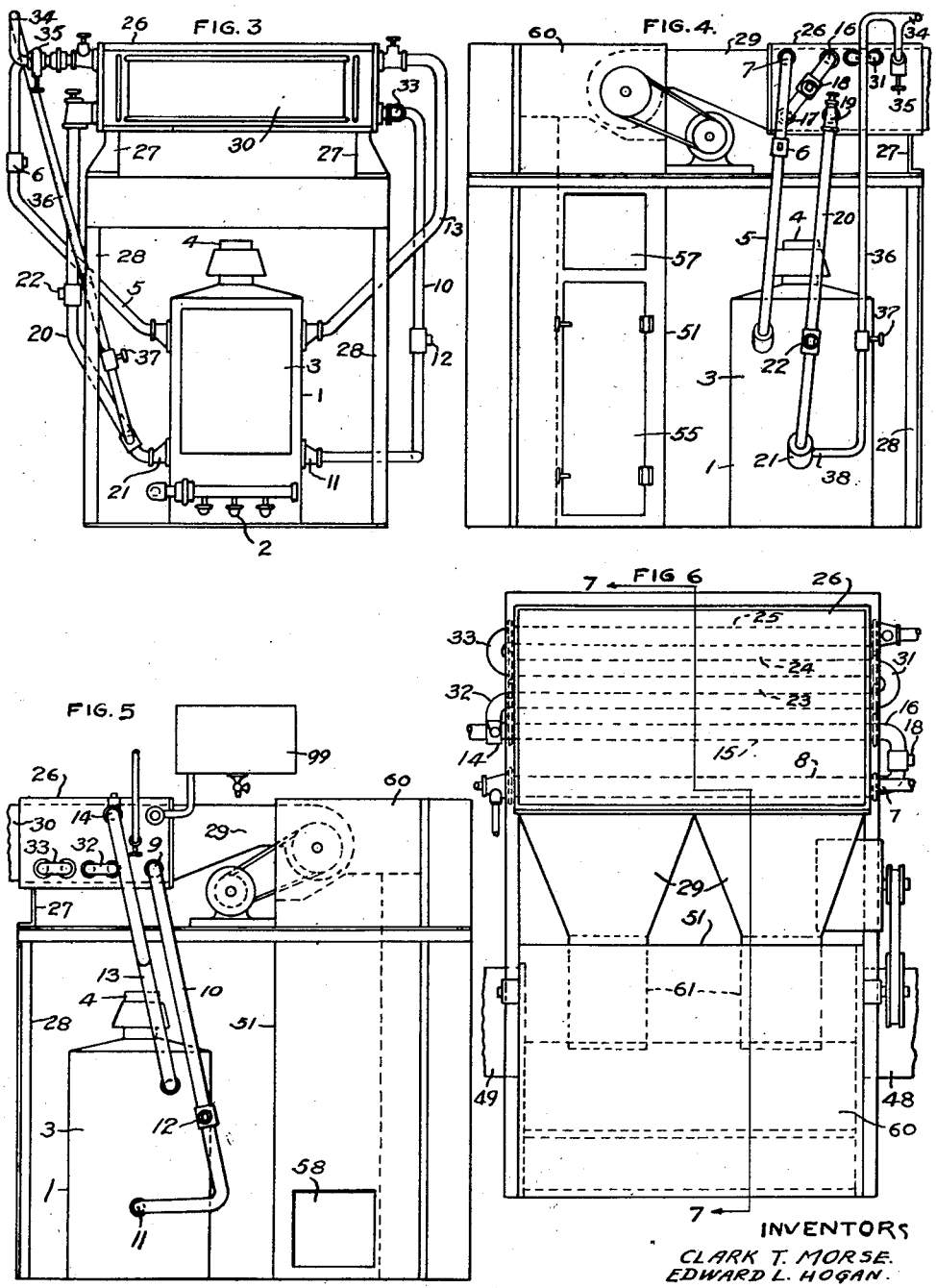

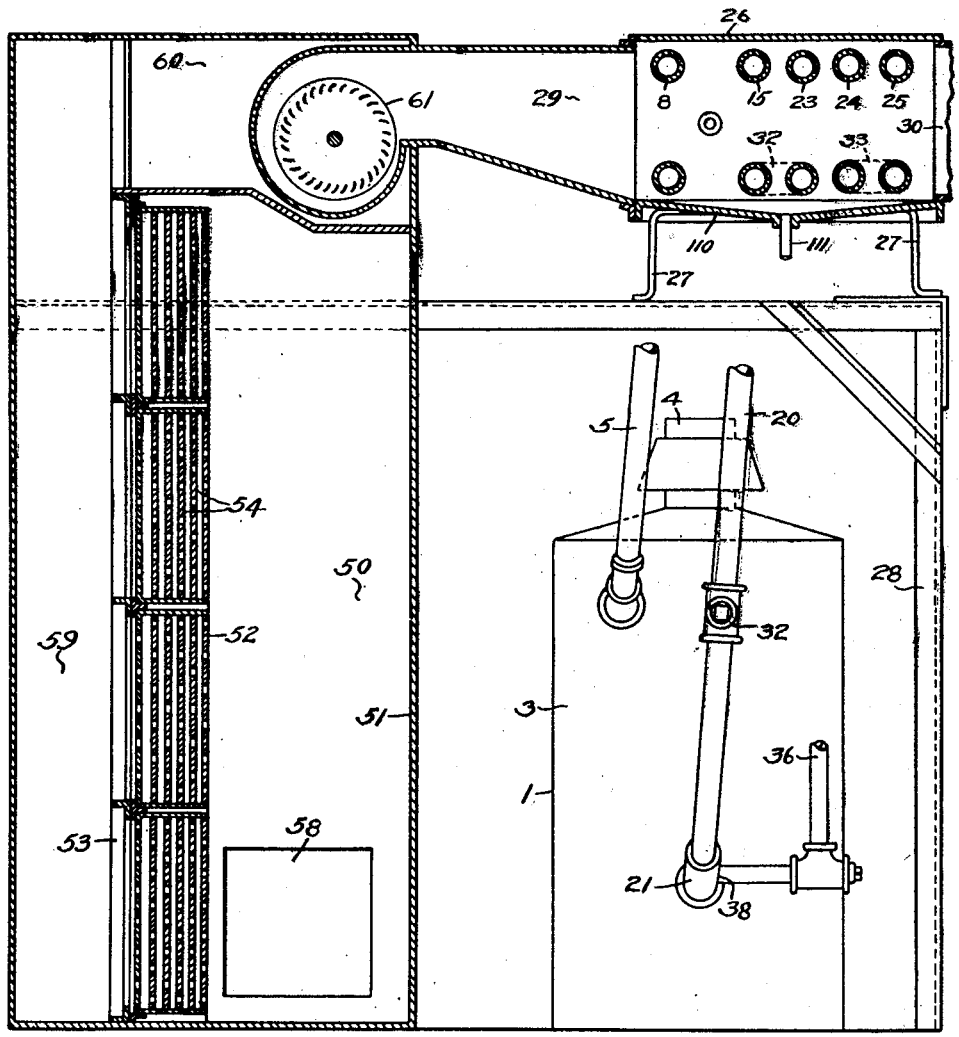

Patented Mar. 14, 1933

1,901,664

UNITED STATES PATENT OFFICE

CLARK T. MORSE AND EDWARD L. HOGAN, OF DETROIT, MICHIGAN, ASSIGNORS TO AMERICAN BLOWER CORP., OF DETROIT, MICHIGAN, A CORPORATION OF DELAWARE

COOLING COIL, STORAGE TANK, AND MEANS FOR COOLING THE WATER IN THE TANK

Original application filed February 12, 1931, Serial No. 515,368. Divided and this application filed December 4, 1931. Serial No. 579,092.

This invention relates to a system of cooling or heating, and a method therefor.

It is the object of this invention to provide the following advantages in a system of heating or cooling an enclosure:

(1) The heating or cooling of an enclosure, or a series of enclosures, comprising a building, through the circulation of either hot or cold air over coils containing either hot or cold water suitably heated or cooled by a boiler, a source of refrigeration, spring, well or city water.

(2) To provide a system of storage, heating and cooling, preferably with off-peak power in periods of low power consumption which can be utilized during periods of high cost heat or power for circulation through the heating or cooling coils of the unit over which the air is moved for delivery to the rooms of the enclosure.

(3) To provide an air circulation system, a heating or cooling coil unit, a boiler for the heating units, a cooler for the cooling units, a storage capacity for either hot or cold water and means of applying the heat or cold from the boiler or refrigerating apparatus to heat or cool the storage liquid; and to associate with such a system city water for cooling purposes.

It will be understood in this application that when water is referred to, there is comprehended within the invention other fluids which are adaptable for use in the system, but for convenience water alone is referred to.

It will be further understood that off-peak power, as at night, can be purchased very cheaply as compared with full peak power during the daytime; and our invention comprehends the application of electric heat or gas during off-peak periods, or the application of electric current for refrigeration purposes, or gas for refrigeration purposes, during such off-peak periods; and the utilization of stored hot or cold water for passage through heating or cooling coils during the period of expensive full peak power, at which time heating or cooling is ordinarily desired, as in the daytime.

Again, it is an object of this invention to provide for the use of city water for cooling purposes so that it can be circulated through the cooling coils during the summer time and the air in the enclosure can be withdrawn, blown over the coils of cold city water, delivered into the enclosure, circulated and returned.

This application is a division of applicants' co-pending application, Serial No. 515,368, filed February 12, 1931.

Referring to the drawings:

Figure 3 is a front elevation of the boiler for hot water, and the heating and cooling coils;

Figure 4 is a side elevation thereof from the left hand side as the mechanism is viewed in Figure 3;

Figure 5 is a view of the same mechanism from the right hand side;

Figure 6 is a detail plan view of the same mechanism;

Figure 7 is a section on the line 7—7 of Figure 6;

Figure 1:
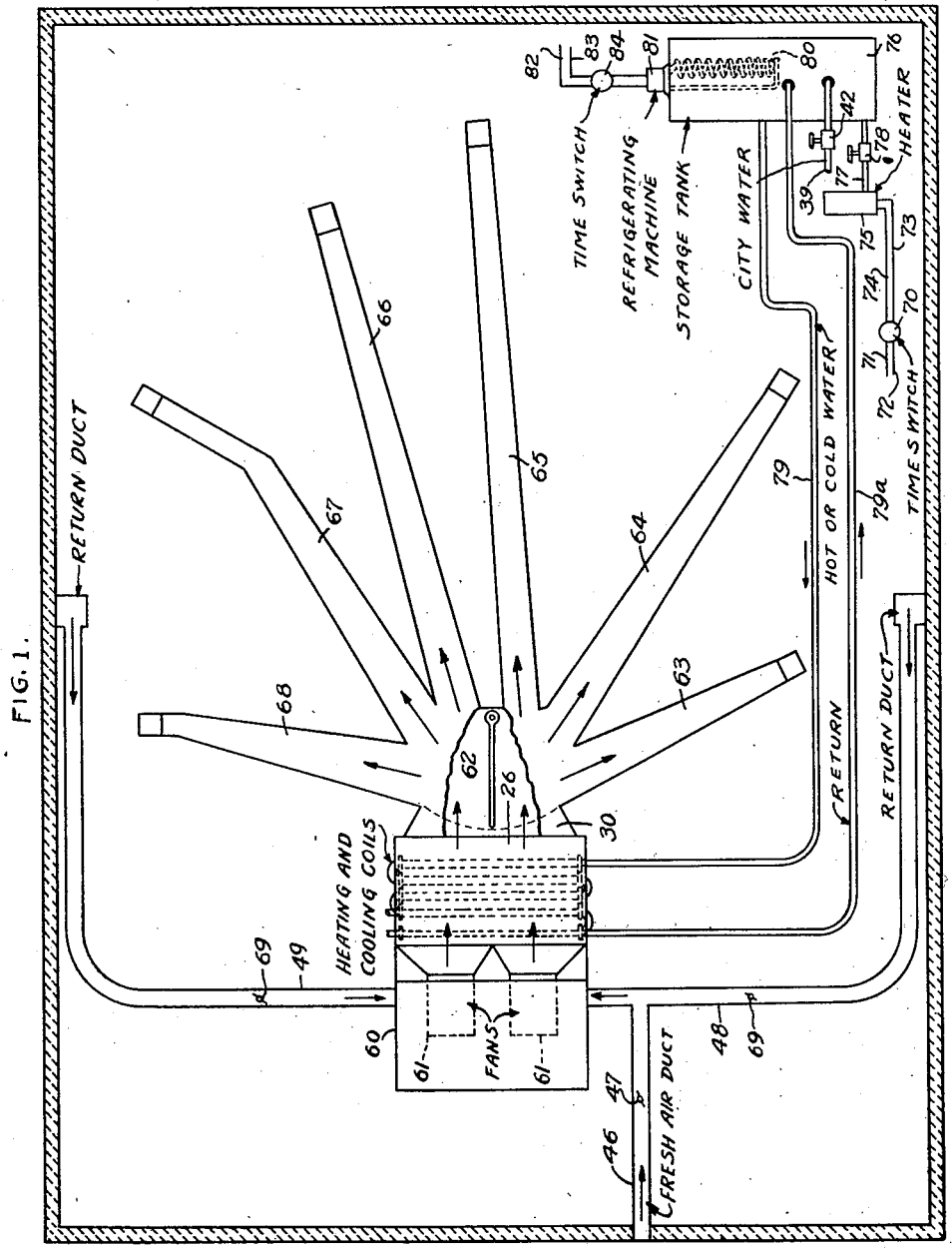
Figure 1 is a diagrammatic view of one form of our invention.

Referring to the drawings in detail, as will hereinafter appear more fully from the description, the essential elements in the diagrammatic views and in the detail views of the mechanism are the same, although slightly differing in physical form between the diagrammatic views and the detail mechanism, as the diagrammatic views have been so made for the purpose of clarity and certain detail of the mechanism has been omitted.

Boiler unit

Referring particularly to Figures 3 to 5, 1 designates a boiler unit having any suitable source of heat, such as the gas burners 2 that are located beneath suitable water tubes within the casing 3. A flue 4 is provided for the exit of gases and products of combustion. It will be understood that this unit may be of any desired type, using any type of fuel.

Heating and cooling coils

From this boiler issues a supply pipe 5 having therein a valve 6. This pipe 5 leaves the top of the boiler and proceeds to the point 7 at the top of the rear heating coil 8. The rear heating coil 8 so supplied on its left hand side is provided with a return line on the right hand side from the point 9 at the bottom of the right hand side of this coil which return line 10 so connected at 9 enters the boiler near the bottom thereof at 11. The return line 10 is provided with a valve 12. From the top of the right hand side of the boiler there proceeds a supply line 13 which communicates at 14 with the top of the second heating coil 15. The top of this second heating coil 15 is connected at 16 by a diagonal cross-over to the bottom of the coil 8 at 17. A valve 18 is provided in the cross-over. The bottom of the coil 15 on the left hand side is connected to the return line at 19, such return line being designated 20, which return line communicates with the bottom of the boiler at 21. A valve 22 is mounted on this line. Cooling coils 23, 24 and 25 are also provided. All of these coils are mounted within a general casing marked 26 mounted on the brackets 27, which brackets are in turn supported by the frame 28. The casing 26 is opened at either end communicating at its rear end with the air inlet passageway 29 and at its forward end with the distribution duct 30. These cooling coils are interconnected at the top between coils 23 and 24 on the left hand side by the cross-over 31. The coils 23 and 15 are connected on the bottom at the right hand side by the cross-over 32. Coils 24 and 25 are connected together on the right hand side at the bottom by the cross-over 33. The coil 25 is connected at its top on the left hand side to the city water inlet line 34 and is controlled by the valve 35. The city water also is connected by the pipe 36 controlled by the valve 37 at the bottom of the boiler at 38. The cold city water thus furnished enters from the city water main at 39. One branch of this main at 40 passes through a plurality of parallel pipes 41 in each of which is a valve 42. The purpose of this arrangement is to control the amount of water flowing from the city line, but in doing so it is necessary to have one or more of the valves 42 wide open to prevent singing in the line due to a valve that is only partially open. Another branch of this city water at 43 has similar pipes 44 and valves 45, the purpose of which will be hereinafter described in connection with the storage system.

Air distribution system

The next feature of our invention is to plan the mechanism for carrying out the plan of circulating air either from outside of the building or from the several rooms thereof through a filter and thence over the heating and cooling coils (either one of said group of coils being in operation) through the distribution duct and through the distribution lines to the upstairs and the downstairs of the building.

Accordingly, we provide a fresh air inlet duct 46 having a control damper 47 which communicates with one of the return ducts 48, the other return duct being designated 49. The air from these return ducts and the fresh air ducts enters a common chamber designated 50. One wall of this chamber is formed by the front wall of the casing at 51 and the other by the front wall of the filter 52, which comprises a frame 53 and a plurality of foraminous filter plates 54 arranged in staggered relationship and combined with suitable filtering material. Any type of filter may be employed but I have illustrated one of the types that has been found successful in current use. A door 55 is provided to enclose this compartment on one side to enable access to be had for the renewal, adjustment or cleaning of the filter. The air from the duct 48 passes in at the top of this compartment at 57 on the left hand side while the air from the duct 49 passes in at 58 at the bottom of this compartment on the other side.

After the air passes through the filter 52, it enters into a compartment, designated 59, behind the filter. Hence, it is drawn upwardly into the fan compartment 60, into the fans 61 and thence discharged through the air discharge passageway 29, the casing 26, through the coils and into the distribution duct 30 where its direction is controlled by the damper 62 so that it may be regulated as to going upstairs or downstairs. The ducts 63, 64 and 65 communicate with upstairs rooms and the ducts 66, 67 and 68 communicate with downstairs rooms. Suitable dampers can be interposed in any of these lines, such as the dampers 69 in the return ducts.

The passing of air through the hot coils or through the cold coils will change the temperature of the air and either heat or cool the several rooms of the building.

Storage system

In many communities it is possible to purchase electric current or gas during off-peak power periods, such as at night, at very much lower rates than during the full power periods or the peak period during the day, or early evening. One of the features of my invention is to provide an arrangement by which either electricity or gas supplied under such circumstances may be utilized automatically at night through the electricity or gas being turned on by a suitable time switch during the period of off-peak load. Such electricity or gas is then used either for heating or refrigerating purposes during the off-peak period for the storage of either cold or heat in some suitable fluid, such as water, ethylene glycol, or other medium.

This general idea is shown in diagrammatic form in Figure 1. 70 indicates a time switch which is connected to the next lines 71 and 72 which may be either electric cables or a gas supply pipe. The time switch and valve connected therewith are standard constructions and form no detail of our invention, as they are well known in the art. The gas or electricity passes through the lines 73 and 74 to a water heater 75. If it is desired to store hot water, communication with a storage tank 76 is had through the pipe 77 and valve 78. Water is thus stored while it is hot in the storage chamber 76. The power or gas is cut off and during the daytime, or during the peak-power periods, the hot water thus stored is circulated through the lines 79 and 79a to the boiler 1 which in turn can circulate it to the coils heretofore described as being employed for heating.

In this connection the water can circulate direct to the coils; and, while the boiler is hooked into the ystem and some of the water would pass through the boiler, it could be arranged so that this heating or cooling of the storage water would pass direct to the coils, and return from the coils separately from the boiler and in conjunction with the boiler. Normally, we would not circulate this medium through the boiler and then let it circulate from the boiler through the heater.

On the other hand, if it is desired to cool the building during the summertime, city water may be supplied through the city water line 39 and valve 42 to the storage tank 76 in which tank it may be stored if it is desired to precool it during off-peak power periods.

Such a means is charged by the refrigeration coils 80 operated by the refrigeration machine 81 which is supplied with current through the power lines 82 and 83 when the time switch 84 opens during off-peak power periods. During the peak-power periods the water can circulate through the cooling coil heretofore described as supplied by lines 79 and 79a which may be connected in such circumstances either to the boiler and then to the coil, as the boiler will then be inoperative, or direct to the cooling coils. The detail arrangements of the piping are not of vital importance. The air can be circulated over these coils containing the cold water.

If, however, it is not desired to store the cold water, then city water can be utilized which, in summertime, is customarily so much cooler than the outside air that upon the circulation of this relatively cold water through the cooling coils and the circulation of air over such coils from the rooms and back to the rooms adequate cooling will be secured.

Figure 2:
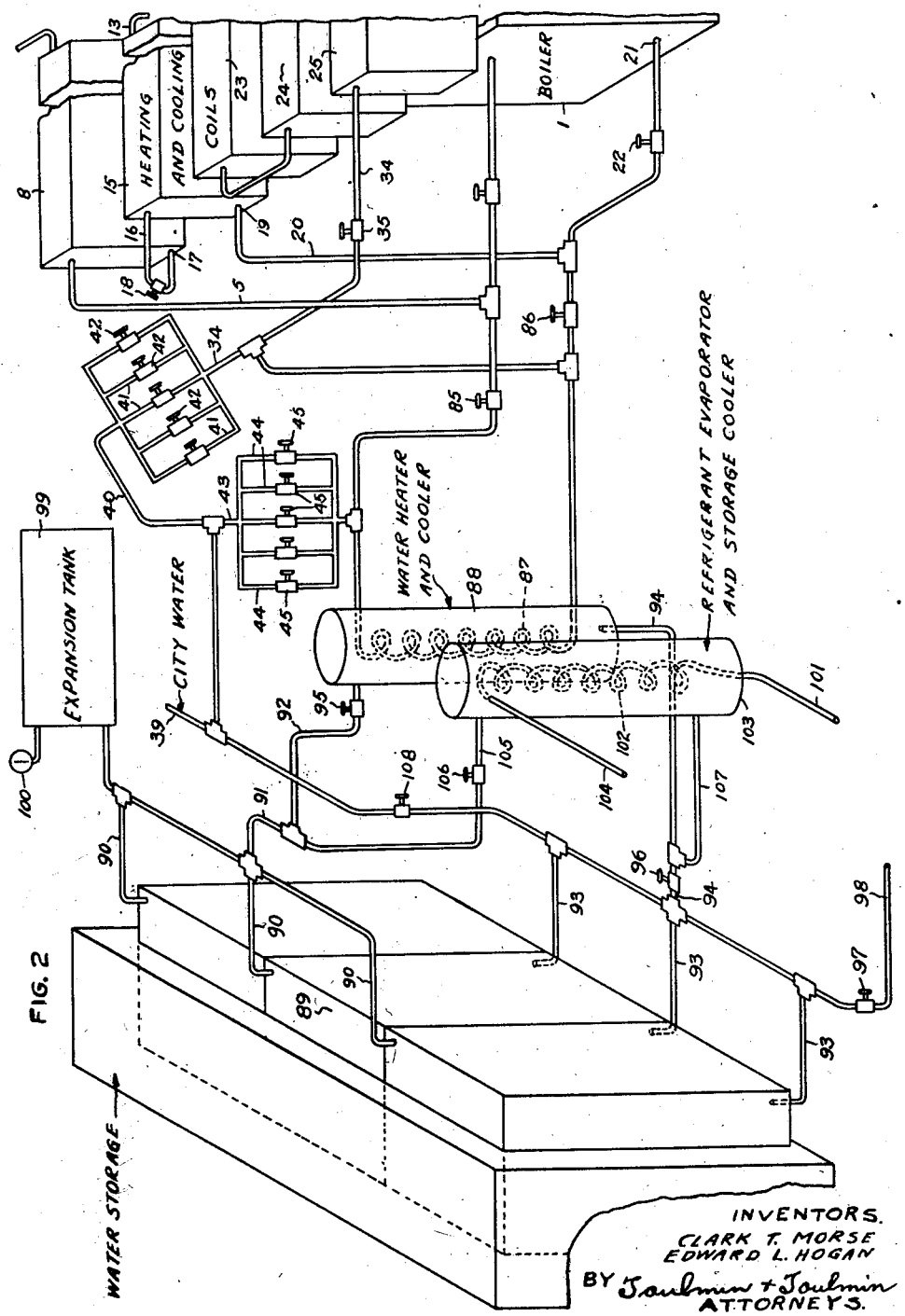
Figure 2 is a diagrammatic drawing of another form of our invention utilizing the storage tank.

As a specific detail construction of this storage system, we provide the construction shown diagrammatically in Figure 2, which will be supplemental to help understand how the principles of operation can be applied as diagrammatically illustrated in Figure 1. Like parts are indicated by like numerals, as heretofore described in other figures. When the boiler and heating units are operating, as heretofore described, the valves 22, 12 and 6 are opened, and the valve 18 is closed.

This arrangement prevents circulation of water through the boilers and permits the cold water supplied through the valve 35 to pass in series through all the sections and in getting from section 15 to section 8, it passes through the valve 18 which must be opened.

When it is desired to store hot water during off-peak periods of power, the valve 85 or 86 is opened and the hot water from the boiler circulated through the coils 87 in the chamber 88.

In order that this water may do some work, there must be a circulation through the other circuit in this water heater unit and either valve 95 or 96, which ever one is closed, will have to be opened.

In doing this the water in the storage tanks 89 is heated as such tanks are connected by the pipes 90, 91, and 92 to the top of the tank 88 and through the pipes 93 and 94 to the bottom of the tank. The rising hot water in the tank 88 will be passed out through the pipes 92, 91 and 90 through the storage tank 89 and the pipes 93 and 94 of the tank 88. A suitable valve 95 controls this outlet and a valve 96 controls the inlet. The valve 97 controls the line 98.

The drain line should drain to the sewer so as to empty out that portion of the system, the supply line coming in from the city supply line 39 being allowed to enter the system through the valve 108 in order to fill the entire system with water, but, when it is desired to drain it out for any particular purpose, it should be drained out through the lower pipe 98 by opening the valve 97.

By this means we are enabled to get very accurate proportioning in control of the water and its heating.

We also connect into the storage tank circuit an expansion tank 99 having a gauge 100 which contains air and water according to the state of the system.

In the event it is desired to convert this system into a system for storing cold water, then the storage tank 89 may have its contents chilled by the circulation of refrigerant through the pipe 101 from a suitable reservoir into a coil 102 in the refrigerant evaporator tank 103. Hence, the refrigerant makes its exit as gas to the refrigerating machine through the pipe 104. The top of this tank 103 is connected by the line 105 controlled by the valve 106 to the pipes 90 and 91, and thence to the top of the water storage tank. The bottom of the storage tank is connected by the pipes 93, 94 and 107 through the valve 96 to the bottom of the refrigerant tank 103.

When the water in the storage tank 89 is cooler than the water in the boiler or the water furnished in the water cooler 88, there is a downward movement of the water from the boilers through the water heater and there would be an upward movement of the water from the tank 89 through the water cooler. In other words it is being heated by cooling the water from the boilers. Consequently, there is a counter flow. If one is heating up the water circulating in the boiler system, that is, in the heating coil system, by means of the storage in the tank 89, the circulation directions are reversed because, in that case, the water from the tank 89 is cooling off in order to heat up the water which supplies the heating coils, which, in turn, transfer this heat to the air. As the water is cooled in the refrigerant evaporator, it circulates from the top of the tank down, warmer water entering at the top and cooler water leaving at the bottom.

When this water circulates through the water heater and the cooler in order to cool off the water in the system, which makes contact with the air, the water from the tank 89 will circulate upwardly in the water heater and cooler because it is increasing in temperature and creates a circulation in the opposite direction in the other circuit of this unit. The water circulates both ways in each circuit in the water heater and cooler, depending upon the change which is taking place in that particular circuit.

The only time the valve 108 will be used is to fill up the storage system or is to maintain its level at any time when leakage occurs. The expansion tank 99 is used so that it can be filled about half full of water, the other half remaining full of air, so that it will take care of a small amount of leakage and also take care of expansion due to changes in temperature in the water in the storage.

In the event it is desired to supply city water from the main 39 to the storage tank 89, that can be done by controlling the valve 108.

If it is desired during the summertime to utilize city water for cooling of the liquid in the water storage tank 89, the lines 40 and 43 may be opened through the passageways 41 and 44 and valves 42 and 45 so as to provide circulation not only through the boiler and cooling coils, but also through the tank 88 and its coils 87.

This arrangement is optional. Ordinarily, the city water is to be used for cooling, and, when it is so used, it will be employed directly in the heating and cooling coils being allowed to enter direct to valve 42 because the efficiency of this water is much greater when it is applied directly to the coils through which the air passes than indirectly.

If the city water is not cool enough to produce the results desired in the room and there is a storage of colder water in the system tank 89, it would be possible to lower the temperature of this city water by passing part of it through the water heater and cooler and then mixing it with the part which was not passed through by opening valves 45 and closing some of the valves 42.

In the event that it is not desired to use any city water, then the cooling may be taken care of by the circulation of water through the water heater and cooler directly through the coils and back to this unit.

Referring to the storage tank 89, it will be noted that it is divided into a plurality of sections so as to make it possible to get such a unit into the average basement through the doors available and also in order to make it self supporting. Instead of having to put braces on the inside to hold the sides of the tank together in order to carry the liquid in the tank, each of the tanks illustrated in the drawings is of sufficiently small size so that when placed adjacent its companion tanks, the tanks will be fairly stable and can be combined as a single unit.

In any event, the storage tank 89 may be insulated by the cover 109, or may be otherwise protected, as by burying under the ground.

110 designates the drip pan placed beneath the coils to catch the condensation therefrom. It also carries away any excess moisture from the humidity spray. It is provided with a drain pipe 111.

It will be understood that any number of sections of coils or type of coils may be employed. Such coils may be employed for either heating or cooling. In that event we would connect the cooling coils in series as indicated, but we would connect the heating coils in parallel. By this we mean that one-half of the coils would have the supply at the top of one side and the return on the other, and the other half would have a supply at the top of the second side and return at the bottom of the first side. If it is desirable to apply the cooling produced by the refrigerating machine direct with the heating and cooling coils, we would then circulate cold water from the bottom of the evaporator through pipe 107, through pipe 94, up through the water cooler, up pipe 92 around through pipe 105, the valve 96 being closed to prevent the cold water from entering the cold water storage.

It will be understood that we desire to comprehend within our invention such modifications as may be necessary to adapt it to varying conditions and uses.

Having thus fully described our invention, what we claim is new and desire to secure by Letters Patent, is:

1. In combination, cooling coils, an air circulation system enclosing said coils through which air is delivered to and from an enclosure, a storage tank for liquid, means for cooling the liquid in said storage tank, and means for modifying the temperature of the liquid in the cooling coils by the use of the storage liquid.

2. In combination, cooling coils, an air circulation system enclosing said coils, through which air is delivered to and from an enclosure, a storage tank for liquid, means for cooling the liquid in said storage tank, and means for modifying the temperature of the liquid in the cooling coils by the use of the storage liquid, without direct contact between the liquid in the storage tank and the cooling coils.

3. In a system of cooling coils arranged in parallel, a plurality of coils, means for supplying liquid to the top of one coil, means for removing liquid from the bottom of the other end of the coil means for supplying liquid from the same source of liquid supply to the top of the next succeeding coil, and means for interconnecting said coils from the top of the last mentioned coil to the bottom of the first mentioned coil, and means for connecting the bottom of the last mentioned coil to the source of supply of liquid, and a plurality of supplementary coils connected into the last mentioned coil by a plurality of cross-overs.

In testimony whereof, we affix our signatures.

CLARK T. MORSE.
EDWARD L. HOGAN.